United States Patent [19]

Kamen et al.

[11] Patent Number: 5,520,973

[45] Date of Patent: * May 28, 1996

[54] DECORATING METHOD AND PRODUCTS

[75] Inventors: Melvin E. Kamen, Highlands; Bhupendra Patel, Edison, both of N.J.

[73] Assignee: Revlon Consumer Products Corporation, New York, N.Y.

[*] Notice: The portion of the term of this patent subsequent to Apr. 26, 2014, has been disclaimed.

[21] Appl. No.: 407,558

[22] Filed: Mar. 20, 1995

Related U.S. Application Data

[60] Division of Ser. No. 199,415, Feb. 22, 1994, Pat. No. 5,487,927, which is a continuation-in-part of Ser. No. 824,968, Jan. 24, 1992, abandoned.

[51] Int. Cl.$^6$ ................................................. C03C 17/38
[52] U.S. Cl. ................ 428/35.7; 156/233; 156/272.6; 156/273.3; 156/275.5; 156/307.7; 156/312; 215/DIG. 6
[58] Field of Search .................... 156/233, 272.6, 156/273.3, 275.5, 275.7, 301.7, 307.3, 307.4, 307.7, 307.9, 309.9, 311, 312, 267, 250; 215/DIG. 6; 428/35.7

[56] References Cited

U.S. PATENT DOCUMENTS

| | | | |
|---|---|---|---|
| 3,235,395 | 3/1962 | Scharf | 117/3.3 |
| 4,053,344 | 4/1977 | Hirahara | 156/247 |
| 4,847,329 | 2/1989 | Koleske | 422/35.7 |
| 4,977,199 | 12/1990 | Koleske | 428/35.7 |
| 5,104,719 | 4/1992 | Kamen | 428/195 |
| 5,178,952 | 1/1993 | Yamamoto et al. | 428/425.8 |

FOREIGN PATENT DOCUMENTS

| | | |
|---|---|---|
| 106628 | 4/1984 | European Pat. Off. . |
| 0445791 | 11/1991 | European Pat. Off. . |
| 57-152992 | 9/1982 | Japan . |
| 59-184746 | 4/1983 | Japan . |
| 5523222 | 3/1986 | Japan . |
| 63-17075 | 4/1987 | Japan . |
| 63-131674 | 5/1988 | Japan . |

OTHER PUBLICATIONS

Research Disclosure 2244: 1991.
Union Carbide Brochure: Formulating Ultraviolet Light Cured Cycloaliphatic Epoxides 1987.
Union Carbide Technical Disclosure "Formulating Ultraviolet Light-cured Cyracure® cycloaliphatic epoxide coatings".

*Primary Examiner*—Charles R. Nold
*Attorney, Agent, or Firm*—Julie Blackburn

[57] ABSTRACT

A method for decorating a substrate with hot stamping foil comprising the steps of:

a) applying an ink composition comprised of a cationically radiation cured cycloaliphatic epoxide to the substrate in a predetermined design, said ink being operable when cured to bond to the substrate, b) curing the ink on the substrate by exposing to the radiation by which it is curable, thereby bonding the ink composition to the substrate, c) pressing a sheet of hot stamping foil against the substrate with a die heated to a temperature sufficient to cause a portion of the hot stamping foil to adhere to the heated, cured ink design but not to the ink-free areas of the substrate, and d) removing the die, thereby leaving behind a portion of the foil adhered to the ink design.

18 Claims, No Drawings

DECORATING METHOD AND PRODUCTS

This is a divisional of application(s) Ser. No. 199,415, filed Feb. 22, 1994, U.S. Pat. No. 5,487,927 which is a continuation in part of U.S. Ser. No. 07/834,968, now abandoned.

TECHNICAL FIELD

The invention is in the field of applying decorative indicia to glass and ceramic substrates.

BACKGROUND OF THE INVENTION

Hot stamping is the heat transfer of a pigmented color or metallized surface from a polyester carrier onto a thermoplastic substrate. A heated die or roller is used to apply pressure to the hot stamping foil. The pressure forces the pigmented or metallized portion of foil into contact with the plastic substrate. The combination of heat and pressure softens the plastic substrate and activates the foil, causing it to adhere to the substrate. When the foil is removed, only the area subjected to the hot stamp remain affixed to the plastic substrate. A vertical stamping or roll-on machine is used for the operation. The vertical stamping machine contains a heated die of brass, steel or silicone rubber to transfer an area of a specific pattern as each part is place into position. Roll-on methods utilize a silicone rubber roller or arced die to apply the foil in a continuous or batch process. Heat transfer can be achieved at temperatures of about 107° C.

Hot stamping is an efficient, inexpensive way to apply decoration to thermoplastic substrates. Hot stamping cannot be used with glass because glass melts at a much higher temperature than most thermoplastic materials.

Generally decoration in the form of gold or silver leaf, color design or printing is applied to glass by a glazing process similar to that used with ceramics. The colored or metallic ink decoration is applied to the glass container by a variety of methods such as silk screen, printing, etc. The container is then subjected to extremely high kiln temperatures and the decoration is, in essence, baked on. Unfortunately this process is time consuming, expensive, energy intensive, and subject to safety considerations due to the high temperatures and gases necessary to operate the kilns.

There is thus a great need for a simple, economical and ultra-safe procedure for applying decoration to glass substrates.

SUMMARY OF THE INVENTION

The invention is directed to a method for decorating a substrate with hot stamping foil comprising the steps of:
   a) applying an ink composition comprised of a cationically radiation cured cycloaliphatic epoxide to the substrate in a predetermined design, said ink being operable when cured to bond to the substrate,
   b) curing the ink on the substrate by exposing to the radiation by which it is curable, thereby bonding the ink composition to the substrate,
   c) pressing a sheet of hot stamping foil against the substrate with a die heated to a temperature sufficient to cause a portion of the hot stamping foil to adhere to the heated, cured ink design but not to the ink-free areas of the substrate, and
   d) removing the die, thereby leaving behind a portion of the foil adhered to the ink design.

DETAILED DESCRIPTION

The term "die" means any object which is capable of being heated to a temperature sufficient to cause the hot stamping foil to adhere to the cured ink design, and is capable of compressing the hot stamping foil against the substrate. Suitable dies include dies of brass, steel or silicone rubber found on traditional stamping machines, hand held rollers, silicone rubber rollers, arced dies, and so on.

The term "substrate" means glass, ceramic or china substrates capable of decoration, including containers, decorative objects, figurines, vases, windows, tiles, etc.

The term "hot stamping foil" means, in general, a laminate comprised of a carrier material (often polyester, cellulose acetate, or another similar material capable of release), a release film, and a decorative or color coat, in that order. The decorative coat is usually color or a metallized coat. The metallized coat can be actual gold, silver, or aluminum which is colored to look like gold or silver, or have holographic properties. The colored layer is most often applied by vacuum metallization. More specifically, hot stamping foil can be defined as a multilayer web comprised of a backing film carrier, a release coating, one or more protective top coatings, one or more color coatings, and a hot melt adhesive, in that order. In the general hot stamping process, the the hot melt adhesive layer of the foil is compressed against the substrate with a heated die. The hot melt adhesive layer adheres to the substrate and the application of heat also causes the release layer to release the backing film carrier from the protective top coat layer leaving the protective top coat layer exposed on the surface of the substrate. The release coating is either a wax or wax-like material, or a thermoplastic material which melts upon application of heat to release the protective top coat layer from the backing for release layers include ethylene vinyl acetate (EVA), acrylics, polyvinylchlorides (PVC), polyamides, or similar thermoplastic materials as set forth in U.S. Pat. No. 5,104,719 which is hereby incorporated by reference. The protective top coating is usually a lacquer of some type which is capable of protecting the color or metallized layer. The final layer is a hot melt adhesive which can be a wide variety of substances, and is selected so that it is capable, upon application of heat, to adhere to the substrate to which it is applied. Generally thermoplastic materials such as EVA, PVC, and the like are suitable hot melt adhesives.

The term "actinic radiation" means light having a wavelength of 4–600 nm.

The term "ultraviolet radiation" means light having a wavelength of 4–400 nm., preferably 325–365 nm.

The ink composition comprises a cationically radiation cured cycloaliphatic epoxide, preferably a cycloaliphatic epoxide having at least two epoxy groups per molecule. Polymeric cycloaliphatic epoxides are, suitable also, such as those formed by the reaction products of epichlorohydrin and phenol or a phenolformaldehyde resin, diepoxy resin, epoxidized oils, and epoxidized polyolefins. Such epoxides include novolac epoxides, glycidyl ethers of various types including diglycidyl ethers of bisphenol, diglycidyl ethers of butanediol, and the like. Also suitable are homopolymers and copolymers that contain pendant epoxide groups such as those made from glycidyl acrylate and or methacrylate with or without other ethylenically unsaturated monomers. Cycloaliphatic epoxides such as those set forth in U.S. Pat. Nos. 3,027,357, 3,890,194, 2,890,197, 3,031,434, 3,125, 592, 3,201,360 and 5,204,930, all of which are incorporated by reference, are suitable. Preferred are 3,4-epoxycyclohexylmethyl-3,4-epoxycyclohexane carboxylate, bis-(3,4- epoxy-cyclohexylmethyl)-adipate, vinylcyclohexene diepoxide, bis(2,3-epoxycyclophenyl)ether, epoxidized butadiene, 2,3-epoxy-2-methylcyclohexylmethyl-3,4-epoxy- 2-methylcyclohexane carboxylate, or mixtures thereof.

The preferred cycloaliphatic epoxides are cationically UV cured cycloaliphatic epoxides sold under the Cyracure tradename by Union Carbide Chemicals and Plastics Company, Danbury Conn., such as Cyracure UVR 6110, 6100, 6379, 6351, and 6200. About 10–90%, preferably 35–90% of the cationically UV cured cycloaliphatic epoxide is suggested.

The ink composition may contain a ester containing polyol having a molecular weight of less than 850 and a viscosity of less than 60 poise for the purpose of controlling the viscosity. These ester containing polyols are oligomers prepared by methods well known in the esterification or alkyd resin art. Suitable polyols are disclosed in U.S. Pat. No. 3,994,851 which is hereby incorporated by reference. The polyols are the reaction product of polycarboxylic acids (such as adipic, azeleic, malic, fumaric, succinic, or glutaric acids) and a polyol (such as ethylene glycol, neopentyl glycol, diethylene glycol, trimethylolpropane monoallyl ether, 1,6-hexanediol, etc.). Polycaprolactone polyols sold under the tradename TONE Polyols by Union Carbide, particularly TONE Polyol 310 or trimethylolpropane caprolactone is preferred. About 1–20% by weight, preferably 3–15% of ester containing polyol is suggested.

The ink composition may also contain an adhesion promoter which is an agent that increases the adhesion of the cycloaliphatic epoxide to the substrate. If the substrate is glass, silanes are excellent coupling agents with glass and will promote adhesion of the ink to the substrate. Acryloxy-functional silanes as disclosed in U.S. Pat. No. 5,221,560, which is hereby incorporated by reference, are suitable. Such acryloxy-functional silanes include 3-methacryloxypropyltrimethyloxysilane, 3,-acryloxypropltrimethoxysilane, 2-methacryloxyethyltrimethoxysilane, 2-acryloxyethyltrimethoxysilane, 3-methacryloxpropyltriethoxysilane, 3-acryloxpropyltrimethoxysilane, 3-acryloxpropltriethoxysilane, 2-methacryloxyethyltriethoxysilane, 3-acryloxpropltriethoxysilane, 2-methacryloxyethyltriethoxysilane, 2-methacryloxyethyltirethoxysilane, etc. Glycidoxy-functional silanes may also be suitable. Glycidoxysilanes include 3-glycidoxpropyltrimethyoxysilane, 2-glycidoxyethyltrimethoxysilane, 3-glycidoxypropyltriethoxysilane, 2-glycidoxyethyltriethoxysilane, 3-glcidoxypropltrimethyl silane, and so on. The glycidoxy silanes are preferred, in particular 3-glycidoxypropyltrimethylsilane. About 1–10% by weight of an adhesion promoter will cause improved adhesion of the ink to the substrate.

If the ink composition is cured with UV or actinic radiation rather than electron beam, it is desireable to add a photoinitiator which catalyzes the polymerization of the cycloaliphatic epoxide. If electron beam is used, a photoinitiator is not necessary. Carbonyl compounds such as ketones and derivatives thereof are especially suitable as photoinitiators, for example methyl ethyl keton, benzophenone, benzyl dimethyl ketal, 1-hydroxycyclohexylphenylketone, 2,2-dimethyoxy-2-phenylacetophenone, diethoxyacetophenone, and 2-methyl-1-(methylethiophenyl)-2-(4-morpholinyl)-1-propanone. Other photosensitive onium salts are particularly good UV activated photoinitiators. The use of photosensitive onium salts to promote cure of epoxides when exposed to UV radiation is described in U.S. Pat. Nos. 4,058,401, 4,138,255, and 4,161,478, all of which are incorporated by reference. The photosensitive onium salts mentioned in these patents are good UV light photoinitiators. The preferred photointiators are triaryl sulphonium salts sold by Union Carbide under the tradename Cyracure UVI 6974. If a photoinitiator is present, about 0.5–20%, preferably 3–15% by weight is suggested.

A defoaming agent is also suggested because it promotes a smooth, even application of the ink onto the substrate, eliminating bubbles and distortions. A variety of defoaming agents are suitable, but preferred are polyalkyl acrylics such as polyvinyl butyl ether in stoddard solvent sold under the tradename BYK-052 and BYK-053 by Ciba-Geigy. Generally about 1–20%, preferably 3–15% of a defoaming agent is suggested.

Other ingredients may be added to the ink including stabilizers, inert fillers, wetting agents, leveling agents, and so on. If present these ingredients comprise about 1–15 % by weight of the total composition.

The preferred ink composition of the invention comprises:

35–85 % of a cationically UV cured cycloaliphatic epoxide

3–15 % of an ester containing polyol

3–15 % of a defoaming agent.

In addition, the preferred composition contains 3–15% of a photoinitiator, and it may contian 1–10% of a silane.

The ink composition of the invention can be applied to the substrate in a variety of ways, including silk screening or screen printing, offset printing, or any other application technique. Silk screening is preferred because it is adaptable to on line production. Hand application using paintbrushes or other similar hand-held applicators may be employed where the ink is applied to a substrate such as a figurine or other highly decorative article which is not readily amenable to screen printing.

After the ink composition is applied to the substrate it is cured by exposure to the radiation by which it is curable. Electron beam may be used to cure the cycloaliphatic epoxide, although, actinic radiation, preferably UV radiation is the appropriate curing agent for the epoxide. The decorated substrate is cured by exposure to UV light for a time sufficient to effect polymerization of the epoxide and the polyol, usually 1–30, preferably 2–25 minutes, depending on how thickly the ink is applied to the substrate. UV conveyers, such as those manufactured by Fusion Systems, work well for this purpose. UV conveyers are comprised of a conveyer belt situated beneath an ultraviolet lamp. When the substrate is placed on the conveyer belt it moves along and is irradiated by the lamp. Obviously, where cure times are greater, the substrate can be passed repeatedly through several conveyers in line, or several times through the same conveyer. The conveyer is set up so that the substrate passes through for the appropriate amount of time to cure and adhere to the substrate.

After the ink has been cured and is adhered to the substrate, the substrate is stamped with hot stamping foil. In particular, the foil is compressed against the substrate with the heated die for an amount of time sufficient to cause the hot stamping foil to adhere to the cured ink design but not the ink free areas of the glass. Generally the die should be heated to a temperature of 250°–400°, preferably 250°–350° F. to cause adherence of the foil to the cured ink design. The die is compressed against the substrate for period of time ranging from fractions of a second to several minutes, depending on the die used, the temperature of the die, and the specific cycloaliphatic epoxide. When the heated die is removed, the hot stamping foil is peeled away. A portion of the hot stamping foil, in particular the hot melt adhesive layer and the metallized or color layer, and the protective top coating if present, in that order remain affixed to the cured ink design such that the hot melt adhesive adheres to the cured ink design, followed by the colored coating layers, and the protective top coat layer on the surface of the container. The protective top coat may or may not contain part of the release coat layer, which is designed to release the carrier layer from the protective top coat.

The decoration which is applied to the substrate is extremely durable and capable of withstanding conditions found in normal handling operations.

EXAMPLE 1

The clear adhesive ink composition was made as follows:

|  | grams | w/w % |
|---|---|---|
| Cyracure UVR 6110 | 50 | 72.73 |
| Polyol 310 | 6.25 | 9.10 |
| Cyracure UVI 6974 | 5.00 | 7.27 |
| BYK-053 | 7.5 | 10.90 |

The ingredients were mixed until dissolved.

EXAMPLE 2

The ink composition of Example 1 was silk screened onto a glass makeup container using a 255 fibers per inch screen imprinted with a decorative design. The glass container was passed through a 300 watt/30 feet per minute UV conveyer for a total of 5 minutes to effect curing of the ink. Gold hot stamping foil (Crown Royal Leaf, Paterson, N.J.) was compressed against the container with a die heated to 250° F. for several seconds. The die was removed leaving a portion of foil adhered only to the ink design resulting in a gold metallic decorative design identical in appearance to gold leaf.

EXAMPLE 3

The ink composition of Example 1 was used to hand paint a simple design onto the side of a ceramic bowl with a fine tipped sable brush. The bowl was subjected to UV radiation by passing it through a 300 watt/30 feet per minute UV conveyer for about 4 minutes. Silver holographic hot stamping foil was compressed against the cured ink design with a die heated to 300° F. for several seconds. The die was removed and a portion of the hot stamping foil adhered to the cured ink design resulting in a metallic silver decoration.

We claim:

1. A glass or ceramic substrate having a decorated and nondecorated portion wherein the decoration has been applied by:
   a) painting a decoration on the substrate in a predetermined design using an ink comprised of a cationicaly radiation curable cycloaliphatic epoxide, said ink being operable when cured to bond to the substrate,
   b) curing the ink on the substrate by exposing it to the radiation by which it is curable, thereby bonding the ink to the substrate,
   c) pressing a sheet of hot stamping foil which is a multilayer web comprised of (i) a hot melt adhesive, (ii) a color coating, (iii) a protective top coating, (iv) a release coating, and (v) a carrier film, against the substrate with the hot melt adhesive layer against the ink design, using a die heated to a temperature sufficient to cause the hot melt adhesive layer of the hot stamping foil to adhere to the heated, cured ink design but not to the ink-free areas of the substrate, and
   d) removing the die, thereby leaving behind a portion of the foil adhered to the ink design but not to the ink-free areas of the substrate.

2. The substrate of claim 1 wherein the die is heated to a temperature of 250 to 400° F.

3. The substrate of claim 1 which is glass.

4. The substrate of claim 3 which is a glass container.

5. The substrate of claim 3 which is a figurine.

6. The substrate of claim 3 which is a window.

7. The substrate of claim 1 which is a tile.

8. The substrate of claim 1 which is ceramic.

9. The substrate of claim 8 which is a container.

10. The substrate of claim 1 which is china.

11. A glass or ceramic container having an inner surface and an outer surface wherein:
    a) the outer surface has bonded thereto a partial coating of a cured adhesive ink which is a cationically radiation cured cycloaliphatic epoxide, in a design that covers less than all of said outer surface, and
    b) the ink design is covered by a multilayer web comprised of a (i) hot melt adhesive, (ii) a color coating, and (iii) a protective top coating, in that order from the ink design outward, said web being adherent to the cured adhesive ink and covering only said ink and not extending to the ink-free areas of said outer surface.

12. The container of claim 11 wherein the adhesive ink is pigmented and the hot stamping foil is applied to only a portion of the cured, pigmented, ink design.

13. The container of claim 11 wherein the color coating is metallized.

14. The container of claim 13 wherein the metal is gold or silver.

15. The container of claim 11 wherein the cationically radiation cured cycloaliphatic epoxide is 3,4-epoxycyclohexylmethyl-3,4-epoxycyclohexane carboxylate, bis-(3,4-epoxy-cyclohexylmethyl)-adipate, vinylcyclohexene diepoxide, bis(2,3-epoxycyclophenyl)ether, epoxidized butadiene, 2,3-epoxy-2-methylcyclohexylmethyl-3,4-epoxy-2- methylcyclohexane carboxylate, or mixtures thereof.

16. The container of claim 11 which is glass.

17. The container of claim 11 which is ceramic.

18. A glass or ceramic container having an inner surface and an outer surface wherein:
    a) the outer surface has bonded thereto a partial coating of a cured adhesive ink comprised of epoxidied butadine, in a design that covers less than all of said outer surface, and
    b) the ink design is covered by a multilayer web comprised of (i) a hot melt adhesive, (ii) a color coating, and (iii) a protective top coating, in that order from the ink design outward, said web being adherent to the cured adhesive ink and covering only said ink and not extending to the ink-free areas of said outer surface.

* * * * *